United States Patent
Norrid (10) Patent No.: US 9,251,477 B2
(45) Date of Patent: *__Feb. 2, 2016__

(54) ONLINE REGISTRATION AND BLOCK TRACKING FOR TRAVEL WHOLESALERS, AGENCIES AND HOTELS

(71) Applicant: International Business Machines Corporation, Armonk, NY (US)

(72) Inventor: Joshua A Norrid, Addison, TX (US)

(73) Assignee: International Business Machines Corporation, Armonk, NY (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/746,044

(22) Filed: Jan. 21, 2013

(65) Prior Publication Data

US 2013/0132137 A1 May 23, 2013

Related U.S. Application Data

(63) Continuation of application No. 09/963,716, filed on Sep. 26, 2001, now Pat. No. 8,364,507.

(51) Int. Cl.
| | |
|---|---|
| *G06Q 40/00* | (2012.01) |
| *G06Q 10/02* | (2012.01) |
| *G06Q 30/02* | (2012.01) |
| *G06Q 40/04* | (2012.01) |

(52) U.S. Cl.
CPC ............... *G06Q 10/02* (2013.01); *G06Q 30/02* (2013.01); *G06Q 40/04* (2013.01)

(58) Field of Classification Search
USPC .............................. 705/5, 6, 37; 709/217, 227
See application file for complete search history.

(56) References Cited

U.S. PATENT DOCUMENTS

| | | |
|---|---|---|
| 5,614,703 A | 3/1997 | Martin et al. |
| 5,864,830 A | 1/1999 | Armetta et al. |
| 6,023,679 A | 2/2000 | Acebo et al. |
| 6,032,134 A | 2/2000 | Weissman |
| 6,044,135 A | 3/2000 | Katz |
| 6,195,420 B1 | 2/2001 | Tognazzini |
| 6,360,205 B1 | 3/2002 | Iyengar et al. |

(Continued)

OTHER PUBLICATIONS

Twelve Prestigious Chinese Hotels Select MICROS's hotelBANK, Its Advanced On-line Hotel Reservation System, Business Wire, Jan. 19, 2000, Source: World Reporter (Trade Mark).

(Continued)

*Primary Examiner* — Hani M Kazimi
(74) *Attorney, Agent, or Firm* — Robert H. Frantz; Maeve L. McCarthy (57) ABSTRACT

A system and method for providing reservation capabilities to a reservation or property management system via a plurality of Internet web sites. Each booking party is directed to a web site containing common content and content specific to the type of booking party, such as a travel agent, wholesaler, or traveler. The system ensures the complete and accurate collection of data regarding a customer and the customer's reservation request through the use of distributed software components and association with customer profiles. Each booking party may create or modify customer profile information to be associated with reservations. The product or service provider may establish and maintain its own set of commission rates, fee amounts and discount values for each type of booking party, thereby allowing the provider to control accuracy and completeness of reservations, as well as revenue flow to the booking parties.

15 Claims, 3 Drawing Sheets

(56) References Cited

U.S. PATENT DOCUMENTS

| | | | |
|---|---|---|---|
| 6,477,503 | B1 | 11/2002 | Mankes |
| 6,873,957 | B1 * | 3/2005 | Chen et al. ............... 705/1.1 |
| 7,167,904 | B1 | 1/2007 | Devarajan et al. |
| 7,328,166 | B1 | 2/2008 | Geoghegan et al. |
| 8,364,507 | B2 | 1/2013 | Norrid |
| 2001/0016825 | A1 | 8/2001 | Pugliese et al. |
| 2001/0049613 | A1 | 12/2001 | Gramann et al. |
| 2002/0082877 | A1 | 6/2002 | Schiff et al. |
| 2002/0156672 | A1 | 10/2002 | Burko |
| 2003/0004760 | A1 | 1/2003 | Schiff et al. |
| 2003/0036929 | A1 | 2/2003 | Vaughan et al. |
| 2003/0061145 | A1 | 3/2003 | Norrid |

OTHER PUBLICATIONS

Fitzgerald, M., Travel Agency Looks to Future System Freedom, Computerworld, Feb. 1, 1993, v27n5, pp. 35, 38.

BEA Systems: TRIP.com selects BEA to run intelliTRIP Internet-based travel planning & reservation servcie, M2 Presswire, May 13, 1999.

Web Ventures Announces Version 4 of 'BookIt! PRO'—Gives Full Travel Agent Access to Airline Computer Reservation Systems Over the Internet, PR Newswire, New York, Oct. 5, 1998. p. 1.

Capterra, "Hospitality Property Management Software Finder", retrieved on Oct. 21, 2008 from http://www.capterra.com/hospitality-property-management-software.

* cited by examiner

ONLINE REGISTRATION AND BLOCK TRACKING FOR TRAVEL WHOLESALERS, AGENCIES AND HOTELS

CROSS-REFERENCE TO RELATED APPLICATIONS (CLAIMING BENEFIT UNDER 35 U.S.C. 120)

This application is a continuation of U.S. patent application Ser. No. 09/963,716, filed on Sep. 26, 2001, by Joshua A. Norrid, which is currently under Notice of Allowance.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Not applicable.

BACKGROUND OF THE INVENTION

1. Field of the Invention

This application is a continuation of U.S. patent application Ser. No. 09/963,716, filed on Sep. 26, 2001, by Joshua A. Norrid, which is currently under Notice of Allowance. This invention relates to the arts of reservation systems for use by individuals, groups of travelers, travel agents and travel wholesalers. This invention also relates to the arts of online business and workflow automation, with especially applicability to the hospitality industry.

2. Background of the Invention

The hospitality industry has undergone many changes in its reservation and booking procedures with the advent of the Internet. Large "chain" and franchise hotels frequently operate proprietary reservation systems that are Internet-based, including websites where travel agents and individual travelers may obtain quotes, property information, and book reservations. These chain hotels can rely upon significant nationwide advertising and name recognition to secure their clientele and attract them to the reservation web site.

Travel agents and travel wholesalers (hereinafter referred to as "agents") are often consulted by travelers to make hotel reservations for them, especially when there is a group traveling together, when the client is looking for a "package" vacation or tour, or when the client is unfamiliar with the destination.

Once a travel agent receives a request to book a franchise or chain-affiliated hotel stay from a client, they generally use a well-known Global Distribution System (GDS), such as Sabre or Galileo, to make the reservation. The GDS sends the reservation information through a router, which identifies the intended hotel and submits the reservation. The router, the GDS system, the agent, and often a Credit Card Clearinghouse all receive some of the revenue as compensation, in the form of a percentage commission or a flat-rate per transaction based upon negotiated rates.

Figure 1:
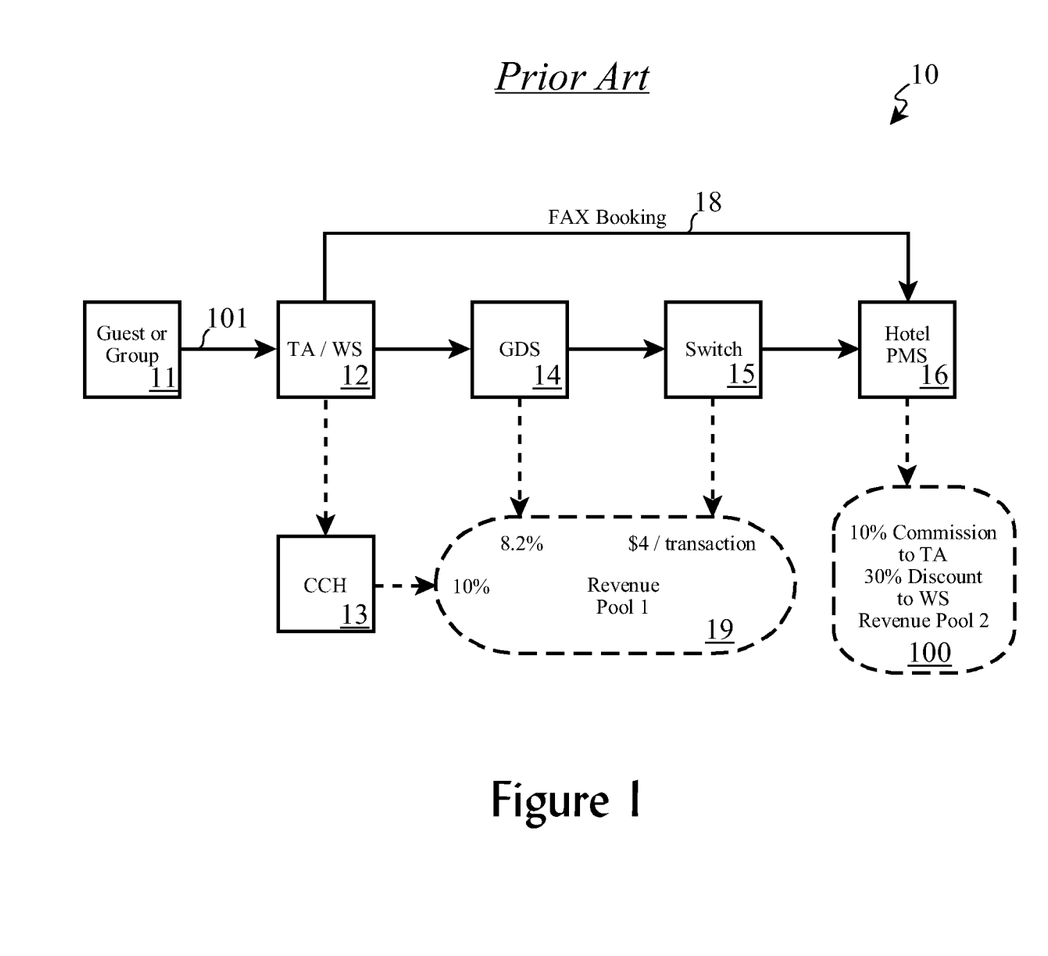
FIG. 1 illustrates reservation processes for booking hotel rooms which are presently followed.

Turning to FIG. 1, details the GDS-based process of handling reservations for a chain or franchise hotel is shown. A guest or group 11 approaches a travel agent or travel wholesaler 12 in order to make reservations. The agent takes the traveler's travel preferences and information 101, including information such as:

(a) the guest's travel dates and destination,
(b) details about the type of room desired (smoking/non-smoking, view, bed configuration, floor, etc.), and
(c) billing information (credit card number, address, telephone number, etc.)

The agent then contacts the GDS system 14, either through a web-based portal or through a proprietary terminal arrangement, to make the reservation. The GDS system 14 forwards the information and reservation request to a switch 15, which forwards the reservation to the appropriate hotel's Property Management System (PMS) 16 to be logged, thus taking the available room or rooms out of available inventory in the PMS.

In this process, each of the agent, GDS and switch receive a payment for their services in the reservation booking If the traveler is paying by credit card, a Credit Card Clearinghouse (CCH) may also receive and process a payment. Typically, the GDS system will receive about 8.2% of the hotel charge as a commission, the switch will receive about $4.00 per transaction (per booking), and the agent and credit card fees may account for another 10% of the total charge for the hotel stay. Normally, these fees are deducted from the hotels revenues, and are seen as the cost of obtaining the booking by the hotel. This total cost of obtaining this reservation or selling this room for this period can be summed as Revenue Pool 1 (19), as shown in FIG. 1.

Independently-owned and non-franchise hotels, however, still rely almost solely on the referrals and revenue from independent travel agents and travel wholesalers to book reservations for their properties in advance because they cannot support the cost of a dedicated reservation system, and because they can acquaint travel agents and wholesalers with their properties through other methods. These types of properties are found most often in cities and regions which are major tourism and vacation destinations, such as Hawaii and Las Vegas. The owners and managers of these properties often invite travel agents and wholesalers to visit their hotels to experience the amenities and location of the property first hand in order to allow the travel agents to personally recommend the hotels to their clientele.

The current reservation procedure for independent hotels is centered on the use of travel agents and travel wholesalers. When a guest or travel group wishes to travel, they approach an agent, who makes recommendations based on their personal experience and knowledge of the hotels in the area. The agent then records the clients' vacation preferences in addition to billing information.

Unfortunately, there is no standardized format or template for information that the agent must collect, which means some important details of the clients' wants and needs may be overlooked. Also, the agent could forget details about the hotel, such as the lack of an ocean view, or a no-pets policy, for example, which might also cause difficulties in communication of the clients' preferences. The most pressing communication problem is, however, the inability of agents to dynamically review the available inventory of the hotel. Agents may make reservations for rooms in a hotel that is already fully booked, or for rooms (the honeymoon suite, for example) that are already reserved.

These independent hotels typically receive their reservations directly from the agents, usually by fax 18, as shown in FIG. 1. Employees of the hotels are responsible for entering the visitor's information, preferences and other data into the hotel's PMS in order to confirm the reservation and remove the room from available inventory. The success of this process is highly dependent on the thoroughness of the agent in collecting and forwarding the traveler's preferences and personal information, as well as the accuracy and thoroughness with which the hotel employee enters the information into the PMS system.

For example, an agent may recall that a particular independent hotel has a set of rooms with beach view, and thus may request a beach view room. If the hotel employee fails to notice this on the fax, which is usually in a freehand a non-standardized format, the guest may be booked for a non-beach view room. This will not be apparent until the guest arrives and is dissatisfied with the room choice. If the hotel is completely booked and the guest cannot be moved to a beach view room, the guest is at minimum very dissatisfied and at most may be due a refund for the hotel fees.

To compound this problem further, agents who book reservations through such direct methods typically receive larger commissions, shown as Revenue Pool 2 100, on the order of 10% for travel agents and up to 30% for wholesales, which reflects the savings of not having a GDS and switch involved in the booking, and serves as an incentive to the agent to book the independent hotel for their clientele.

As a result, many of the reservations made by agents directly with independently-owned hotels contain errors, at the surprise of the traveler who was assured personally by the agent that the agent was familiar with the property, and at the economic loss of the hotel which pays a higher commission for this type of sale and which often must pay for replacement accommodations and/or forgo premium rates for upgraded room types.

Overbooking, along with all of the aforementioned difficulties in communication between the agent and the hotel, decreases customer satisfaction, and therefore decreases repeat business, which causes an immediate as well as a long term loss of revenue for the hotel.

Therefore, there is a need in the art for a system and method which allows travel agents, travel wholesalers, and travelers to book reservations with independently-owned and nonaffiliated hotels in a manner which avoids overbooking, communicates accurately and completely reservation preferences, and provides a standardized or common set of information regarding the guests such as billing details, confirmation address, etc. Further, there exists a need in the art for this system and method to be available through commonly used technologies, such as the Internet and web browsers, in order to be useful to a broad range of users and to facilitate the greatest possible acceptance and success of the system.

BRIEF DESCRIPTION OF THE DRAWINGS

The following detailed description when taken in conjunction with the figures presented herein provide a complete disclosure of the invention.

SUMMARY OF THE INVENTION

The invention allows a hotel such as an independently-owned hotel to maintain its own records of rates, commissions, and guest profiles, and provides a flexible system for use by many different groups. This flexible system of maintaining rates increases revenue for both the hotel and the users of the system.

A primary web server is provided to allow direct access to the hotel's booking service, and a content router is used to duplicate portions of the primary web server's content to "clone" sites. Each clone site may be tailored to provide dynamic content for the differing types of users, one clone site for each of:

(a) private individuals (e.g. travelers booking directly themselves);
(b) travel agents;
(c) travel wholesalers;
(d) GDS-based systems; and
(e) "dot com" wholesalers.

Another critical business feature of the invention is that different booking parties are not allowed to access or view rates negotiated by the other booking parties. This preserves the hotel's ability to negotiate and offer different rates (and commissions) with different booking parties.

The web-based services, then, enforce a uniformity in the information received with a reservation, regardless of the source of the reservation. Since the data received by the hotel is consistent regardless of the source, customers are better matched with rooms that meet their needs, and leave the hotel satisfied with their stay. Because the inventory of rooms and amenities that the hotel offers is dynamically updated and reflected in the users' web sites, accidental overbooking decreases, creating more satisfied customers and ultimately more revenue for the hotel.

DETAILED DESCRIPTION OF THE INVENTION

The present invention provides an improved business model for booking reservations with independently-owned and nonaffiliated hotels, including a convenient online or web-based interface to make the hotel reservations.

Each different set of "users", such as travel agents, travel wholesalers, "dot-com" agents, GDS systems, and individual guests, are provided access to a user interface customized to suit their specific needs. Further, according to the method of the invention, the hotel is provided all the required data that it needs to adequately satisfy its clientele with accurate and complete reservations.

The users of the online system may also determine the availability of their preferred accommodations, ensuring that all the preferences are met. Repeat customers may use a saved online guest profiles to book rooms quickly, or change an existing reservation.

The prime benefit to this system is that the hotels have complete control over the rates that are offered and commissions and services fees allowed to agents and wholesalers. Because of this flexibility, the percentage of revenue given to agents can vary by agent, rather than having a fixed uniform rate for all agent-based reservations.

To implement this system, the hotel Property Management System (PMS) maintains a database of guest profiles and a database of the rates offered to the different groups making reservations (e.g., travel agents, wholesalers, web-based agents, etc.). This list could even be extended to include convention guests, or repeat customers ("frequent guests"), if the hotel so wishes.

The hotel utilizes a content router to copy the contents of a primary hotel web server to additional servers, each of which is customized for the group that will be accessing the site. While the website design and overall content will be uniform and a high degree of commonality, different users will have customized interfaces and may be provided or quoted appropriate rates as set by the hotel.

To make a reservation using the updated system, a guest or group of guests (hereinafter "guest") has several options. If the guest is familiar with the hotel through a previous visit or a referral, they can access the hotel web site directly and make a reservation there. If they choose to use a travel agent or wholesaler, a GDS, or a web-based travel agent or wholesaler, these parties can also access the hotel web site via the Internet to make reservations.

Figure 2:
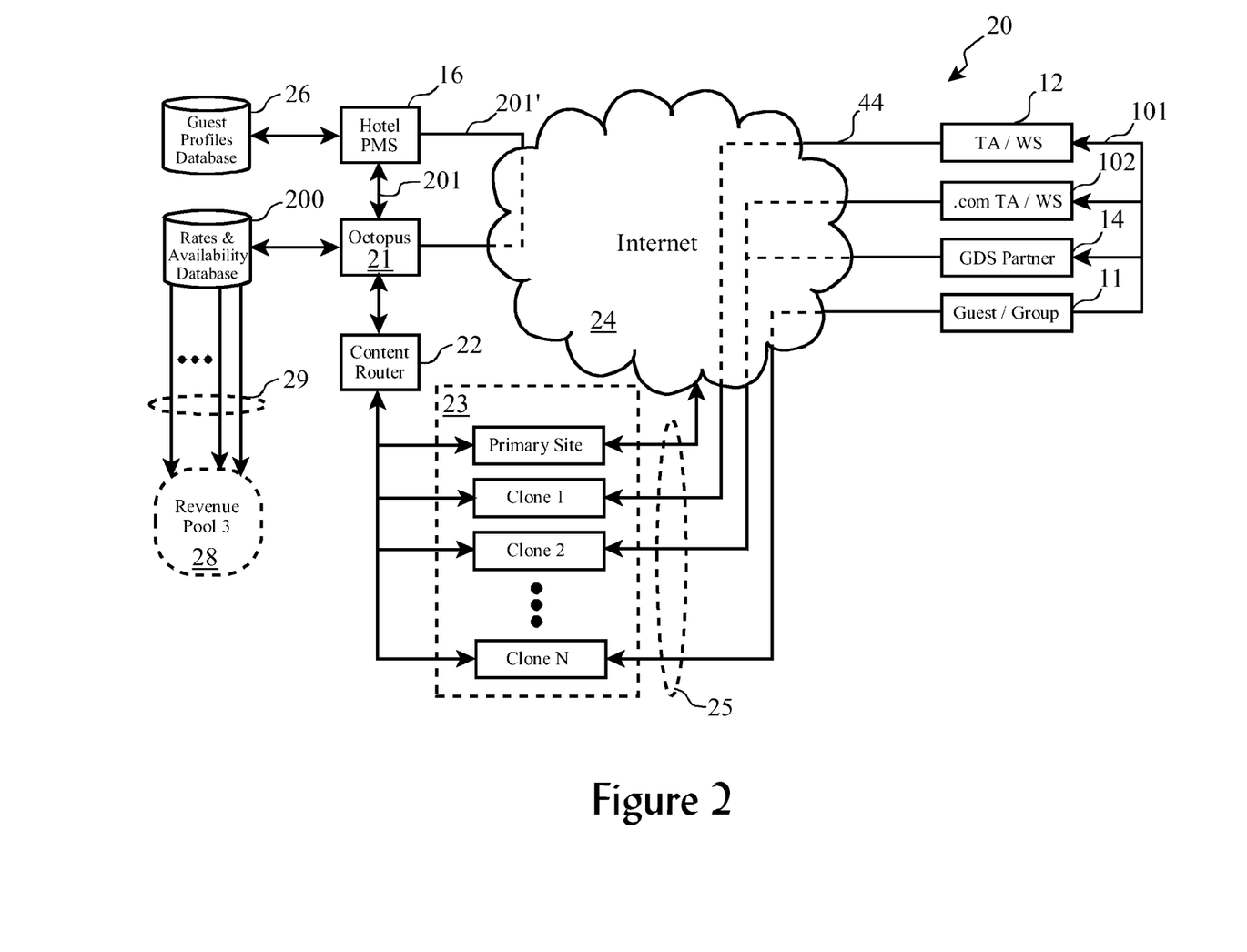
FIG. 2 sets forth details of a process and a component arrangement according to the invention.

Turning to FIG. 2, details of the new process 20 for handling reservations according to the invention via the Internet 24 is disclosed. A guest or group 11 may make a reservation by contacting 101 a travel agent or wholesaler (TA/WS) 12 in the same manner as previously available in the art.

The guest or group 11 can also, however, contact a web-based travel agent or wholesaler ("dot-com TA/WS"), such as Travelocity.com™ or Expedia.com™ (hereafter referred to as ".com agent") 102, a GDS partner 14, or use the a web browser to make the reservation directly.

According to the preferred embodiment of the invention, the GDS will take a lesser role in the reservation process than in the previous process and arrangement because both TA/WS and independent travelers are provided with direct booking capabilities. A benefit with this embodiment is to effectively remove the GDS from the agent's preferred pathway by offering agents increased commissions for dealing directly with the hotel via the invention, such as the increased commissions offered for fax booking today.

Any of the involved parties—the agent 12, the dot-com agent 102, the GDS system 14, or the guest 11—can communicate directly with the hotel system via the Internet 24. The booking system user is directed 25 to one of the web sites 23 which specifically addresses his or her needs, and collects a standardized, uniform set of information. According to the preferred embodiment, different Universal Resource Locator (URL) addresses are assigned to each web site 23 to achieve the redirection 25, but alternatively redirection could be done using subdomains, cookies, and applet functions.

In order to realize the new system, an "Octopus" system 21 is provided to interface the hotel's Property Management System (PMS) to the web sites 23, coupled through a content router 22.

According to the preferred embodiment, the Octopus system is based upon an IBM Netfinity™ computing platform, such as a Netfinity 7600™. The Netfinity™ platform is an Intel-based enterprise server line that is based on IBM's X-architecture. The platform would include communication services which would enable applications to communicate with other applications, whether interoperable or not, using any number of protocols such as Transmission Control Protocol/Internet Protocol (TCP/IP). The Netfinity™ 7600 provides four Intel Pentium III Xeon™ processors operating at 700 MHz, 8 GB of error checking and correcting memory, over 2 TB (terabytes) of disk storage, and runs the well-known Windows 2000™ operating system from Microsoft. The IBM Netfinity™ family of computers are well known in the art.

The computing platform is provided with Microsoft's Windows NT™ operating system, IBM's WebSphere™ application server suite, and IBM's DB/2 Universal Database (UDB) software. The logical processes described herein are realized as Java Bean components with VisualAge for Java, according to the preferred embodiment.

Returning to FIG. 2, the hotel's Property Management System (PMS) 16 is enhanced to include a datastore of guest profiles 26, if it does not already have one. A guest profile may contain the guest's name, address, telephone number, credit card information, and accommodation preferences (smoking/non-smoking, ground floor, choice of views, bed sizes and configurations, etc.). These profiles may be created by the hotel staff directly through a terminal to the PMS, or according to the preferred embodiment, may be created and maintained by the guests and travel agents themselves via the Internet, as described later.

The Octopus 21 is interfaced to the PMS 16 either directly 201, such as through terminal emulation, or indirectly through a data communication protocol such as TCP/IP or another Internet protocol 24.

The Octopus 21 has a rates and availability datastore 200 which contains tables or records for each booking party which define:

(a) room rates and quantities allowed to that booking party;
(b) commissions and fees allowed to that booking party; and
(c) preferably a recent "copy" of the hotel's availability for rooms by date and room type.

For example, all travel agents may be allowed 12% commission, all wholesalers 25% commission, and direct-booking groups of 10 or more rooms 10% discount. Further, specific booking parties may be allowed special or unique commissions, fees or room rates, such as "Bob's Discount Travel" may be allowed a 14% commission. Table 1 shows an example rate table.

The rates and availability datastore 200 also includes a "snapshot" of the room availability taken from the Hotel PMS 16 on a periodic basis, according to the preferred embodiment. This reduces the amount of availability transactions posted to the PMS 16 by occasionally updating or synchronizing a copy of the available rooms database from the PMS to the Octopus.

Additionally, a limit to the number of rooms available at each rate may be imposed, such that the invention may allow for increasing or decreasing rates as sales are received from each booking party.

TABLE 1

Example Rate Table travel agent, 0.12, "commission"
wholesaler, 0.25, "commission"
dot-com TAWS, .15, "commission"
group_direct, .10, "discount"
"Bob's Discount Travel", .14, "commission", max_rooms=12

The invention provides several web sites 23, each site having common content with the others and some custom content for the intended user. For example, there may be a primary web site which is generic in content. A first "clone" site may contain the common content with some customized content to provide information specific to travel agents and wholesalers 12.

A second clone site may be provided with the common content and specialized information for the dot-com TA/WS parties 102. Likewise, other clone sites may be provided targeted for access by "frequent guests" and GDS partners.

The common content on each site is maintained and distributed by the content router 22 from the Octopus 21. Site-specific content is provided from the Octopus 21 to each clone site, as well as software components to provide functions to the web sites such as:

(a) collection of guest profile information for creation of a new guest profile;
(b) retrieval and modification of guest profile information for updating by the guest or TA/WS;

(c) collection of travel dates, party sizes, room preferences from the booking party;

(d) display of available rooms and rates;

(e) confirmation of reservations; and (f) retrieval and modification of reservations.

These software components may enforce the common information collection from all sites, regardless of the source of the reservation booking.

In operation, a booking party (12, 102, 13, 11) may access a web site 23. If no guest profile is on record, a software component may provide the booking party a secure web form for entering guest information. This information, when complete, is then submitted by the component to the content router 22, which forwards the information to the Octopus 21, which then creates a new guest profile 26 through the PMS 16.

If a guest profile is already on record, the web site may provide a login function or other profile recall method to allow the booking party to recall the profile, in which case, a request for the profile is transmitted from the web site 23 through the content router 22, to the Octopus 21 and to the PMS, and the profile may be returned along the reverse path after it has been retrieved from the guest profiles datastore 26.

The guest may then be provided by a software component with another web form to indicate planned travel dates, party size, and any amenity preferences. Upon completion of this form, the reservation request details are transmitted to the Octopus 21 via the content router 22. The Octopus 21 may query the PMS 16 for available rooms as indicated, and if available, may retrieve an appropriate rate or discount from the rates datastore 200. The Octopus 21 then provides an availability quote back to the booking party through the web site 23.

A software component on the web site 23 may display this quote to the booking party, and allow the booking party to confirm the reservation. If the reservation is confirmed, the software component transmits a confirmation notice to the Octopus 21, which then confirms the reservation with the PMS 16, taking the room or rooms out of available inventory and associating all of the guest profile information with that reservation.

Additionally, upon confirmation of the reservation, the Octopus 21 may consult the rates datastore 200, calculate the commissions due to the booking party, if any, and record those for payment later, thereby generating a revenue pool 28 under the control and specification of the hotel.

Figure 3:
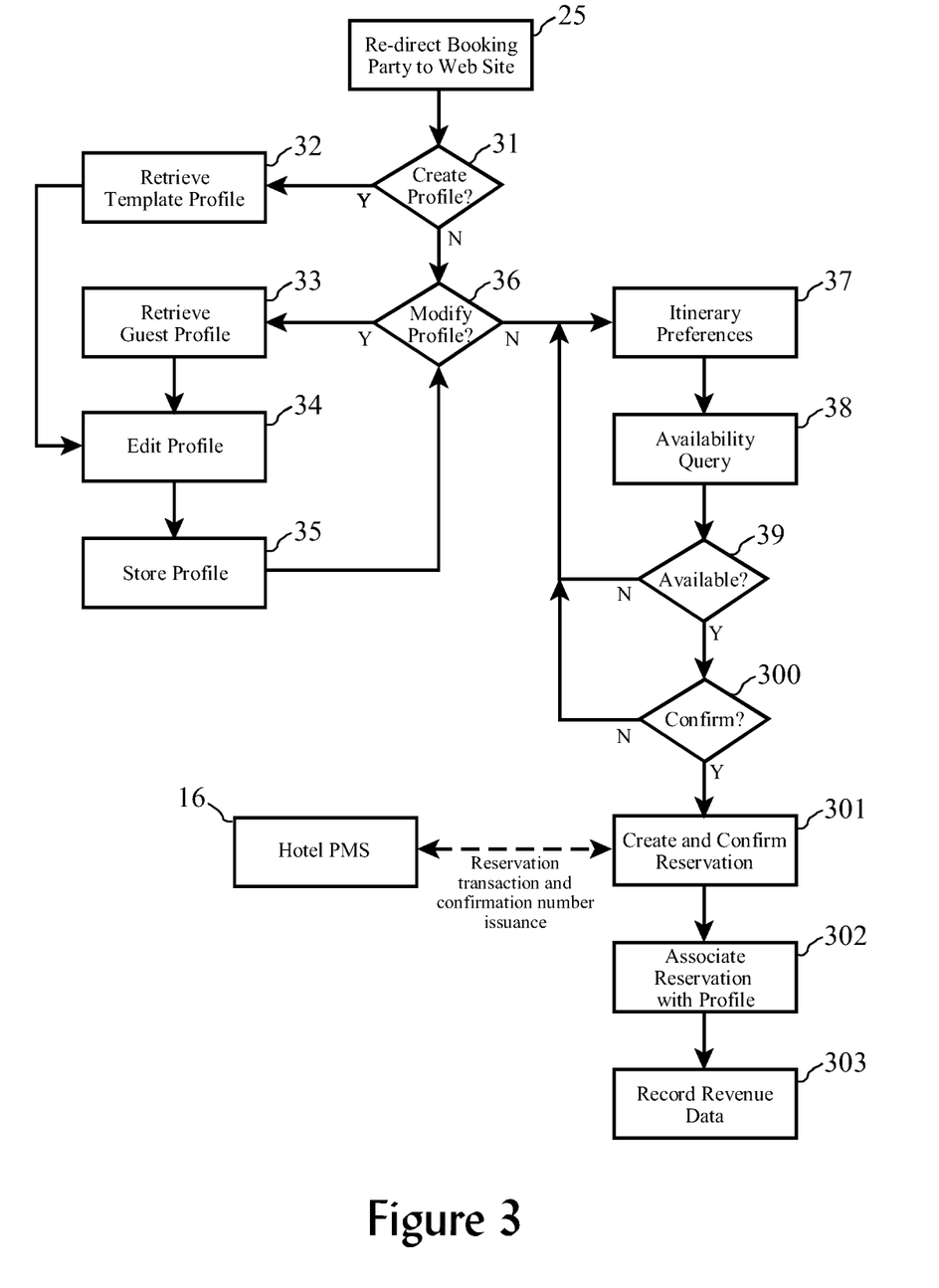
FIG. 3 shows a logical process according to the invention.

Turning to FIG. 3, the overall logical process of the invention is shown. First, the booking party is redirected 25 to an appropriate clone web site or subdomain. The booking party is then preferably provided an opportunity to create a new guest profile at a hotel of his or her choice, such as providing a button or link on a web page.

If this option is selected 31, then a template profile is retrieved 32 from the hotel's PMS system, the guest may complete the profile by entering the requested information such as name, address, telephone number, credit card details, and amenity preferences. If the information is correct and passes error checking such as credit card validation and logical completion of all required fields, the new guest profile is stored 35 in the hotel's PMS system.

The booking party is also preferably provided an option to retrieve and modify his or her existing profile from an indicated hotel's PMS, such as by providing a button or link on the web page for such an option. If this option is selected 36, the booking party's profile is retrieved 33 from the hotel's PMS, and edited 34 by the booking party. If the information is correct and passes error checking such as credit card validation and logical completion of all required fields, the new guest profile is stored 35 in the hotel's PMS system.

It is important to note that a profile can potentially be created for a one-time use, such as the arrival and stay of a group. In this case, the profile may reflect the preferences of the group, such as a senior citizens group who all prefer first floor rooms. Also, with proper authorization, a travel agent or wholesaler could create or modify profiles of guests.

It is also important to note that appropriate security measures can be implemented, such as use of passwords to prevent unauthorized access to a guest profile and use of secure transmission technologies to prevent "snooping" of personal data while in transit across the Internet.

Once a profile has been created (or updated), the booking party is provided a form such as a Hyper Text Markup Language (HTML) form or Java applet dialog box which allows the booking party to enter information regarding the guest's itinerary and specific preferences. For example, the form may collect 37 the arrival date, departure date, and room options (view, location, smoking/non-smoking, bed configurations, handicap access, etc.). If all entered information passes a validity check, an availability query 38 is made to the hotel's PMS.

If the PMS system indicates the requested accommodations are not available 39, then the booking party may be offered a chance to modify the itinerary and/or amenity preferences 37.

If the PMS system indicates that the desired accommodations are available 39, the booking party is offered the option to confirm 300 the reservation. If the booking party elects to confirm the reservation, the reservation is created 301 by executing a transaction with the Hotel PMS 16, obtaining a confirmation number from the PMS 16, and associating 302 the reservation with the guest profile in the hotel's PMS. Otherwise, the booking party is provided an opportunity to update or modify the itinerary and stay preferences 37.

Once a reservation is confirmed, the rate tables for commissions, fees and discounts is accessed, and a revenue for that reservation is calculated 303 and recorded for later use in disbursement of revenue (or application of discount) to the booking party.

While certain details of a preferred embodiment have been disclosed, it will be readily recognized by those skilled in the art that certain process variations, alternate computing platforms and software technologies (languages, operating systems, design methodologies, etc.) may be employed without departing from the spirit and scope of the present invention. It will also be recognized by those skilled in the art that the invention may be applied to other types of products and services which can be reserved in advance, such as rental cars and recreational vehicles; airline, train and cruise travel; golf tee times; amusement and entertainment tickets; and products due for release such as movies, software and books. Therefore, the scope of the present invention should be determined by the following claims.

What is claimed is:

1. A method for applying a reservation to a web site of a primary reservation system, the method comprising the steps of:

the primary reservation computer system having a processor, and serving three or more respective clone reservation computer systems each of which also have a processor, the respective web sites of the clone reservation systems having different user interfaces tailored for respective types of reservation booking parties, wherein the primary reservation management system is interfaced to a hotel property management system without communicating through any intervening reservation system;

redirecting a reservation booking party from a web site of the primary reservation computer system to one of the clone reservation computer systems web sites which has the user interface tailored for the type of the redirected booking party, wherein the redirection comprises a redirecting from a primary domain to a clone subdomain; and the primary reservation system receiving from the one clone reservation computer system web site, reservation data from the redirected booking party entered by the user interface of the one clone reservation web site, the reservation data including travel information and repeating preferences for a customer, and in response, the primary reservation computer system establishing a corresponding reservation for the booking party without communicating through an intervening reservation computer system.

2. The method as set forth in claim 1 wherein the redirecting comprises redirecting from a primary Universal Resource Locator to a clone Universal Resource Locator.

3. The method as set forth in claim 1 further comprising a user interface provided by a clone reservation computer system enabling the booking party to create a new customer profile.

4. The method as set forth in claim 1 further comprising a user interface provided by a clone reservation computer system enabling the booking party to modify an existing customer profile.

5. The method as set forth in claim 1 wherein the reservation data comprises one or more data selected from the group consisting of a hotel reservation, a travel ticket reservation, a rental car reservation, a golf tee time reservation, an entertainment ticket reservation, and a product pre-order reservation.

6. A computer program product for applying a reservation to a web site of a primary reservation system, the computer program product comprising: one or more computer-readable storage devices excluding a propagating signal per se; and program instructions stored on the one or more computer-readable storage devices for causing a processor to perform steps:

serve three or more respective clone reservation computer systems by the primary reservation computer system wherein each of the computer systems as a process, and each respective web sites of the clone reservation computer systems having different user interfaces tailored for respective types of reservation booking parties, wherein the primary reservation management system is interfaced to a hotel property management system without communicating through any intervening reservation system;

redirect a reservation booking party from a web site of the primary reservation computer system to one of the clone reservation computer system web sites which has the user interface tailored for the type of the redirected booking party, wherein the redirection comprises a redirecting from a primary domain to a clone subdomain; and receive reservation data from the redirected booking party entered by the user interface via the one clone reservation computer system web site, the reservation data including travel information and repeating preferences for a customer, and in response, the primary reservation computer system establishing a corresponding reservation for the booking party without communicating through an intervening reservation system.

7. The computer program product as set forth in claim 6 wherein the redirecting comprises redirecting from a primary Universal Resource Locator to a clone Universal Resource Locator.

8. The computer program product as set forth in claim 6 further comprising program instructions for providing a user interface by a clone reservation computer system to enable the booking party to create a new customer profile.

9. The computer program product as set forth in claim 6 further comprising program instructions for providing a user interface by a clone reservation computer system to enable the booking party to modify an existing customer profile.

10. The computer program product as set forth in claim 6 wherein the reservation data comprises one or more data selected from the group consisting of a hotel reservation, a travel ticket reservation, a rental car reservation, a golf tee time reservation, an entertainment ticket reservation, and a product pre-order reservation.

11. A computer system for applying a reservation to a web site of a primary reservation system, the computer system comprising:

one or more processors;

one or more computer-readable memories, one or more computer-readable storage devices; and program instructions stored on at least one of the one or more storage devices for causing the one of the one or more processors to perform steps comprising:

serve three or more respective clone reservation computer systems by the primary reservation computer system wherein each of the computer systems as a process, and each respective web sites of the clone reservation computer systems having different user interfaces tailored for respective types of reservation booking parties, wherein the primary reservation management system is interfaced to a hotel property management system without communicating through any intervening reservation system;

redirect a reservation booking party from a web site of the primary reservation computer system to one of the clone reservation computer system web sites which has the user interface tailored for the type of the redirected booking party, wherein the redirection comprises a redirecting from a primary domain to a clone subdomain; and receive reservation data from the redirected booking party entered by the user interface via the one clone reservation computer system web site, the reservation data including travel information and repeating preferences for a customer, and in response, the primary reservation computer system establishing a corresponding reservation for the booking party without communicating through an intervening reservation system.

12. The system as set forth in claim 11 wherein the redirecting comprises redirecting from a primary Universal Resource Locator to a clone Universal Resource Locator.

13. The system as set forth in claim 11 further comprising program instructions for providing a user interface by a clone reservation computer system to enable the booking party to create a new customer profile.

14. The system as set forth in claim 11 further comprising program instructions for providing a user interface by a clone reservation computer system to enable the booking party to modify an existing customer profile.

15. The system as set forth in claim 11 wherein the reservation data comprises one or more data selected from the group consisting of a hotel reservation, a travel ticket reservation, a rental car reservation, a golf tee time reservation, an entertainment ticket reservation, and a product pre-order reservation.

* * * * *